US012077280B2

(12) United States Patent
Taylor

(10) Patent No.: US 12,077,280 B2
(45) Date of Patent: Sep. 3, 2024

(54) OSCILLATION SYSTEM

(71) Applicant: BAE SYSTEMS plc, London (GB)

(72) Inventor: Adam Taylor, Rochester (GB)

(73) Assignee: BAE SYSTEMS PLC, London (GB)

( * ) Notice: Subject to any disclaimer, the term of this patent is extended or adjusted under 35 U.S.C. 154(b) by 439 days.

(21) Appl. No.: 17/282,040

(22) PCT Filed: Sep. 16, 2019

(86) PCT No.: PCT/GB2019/052591
§ 371 (c)(1),
(2) Date: Apr. 1, 2021

(87) PCT Pub. No.: WO2020/070468
PCT Pub. Date: Apr. 9, 2020

(65) Prior Publication Data
US 2021/0371084 A1 Dec. 2, 2021

(30) Foreign Application Priority Data
Oct. 4, 2018 (GB) .................................. 1816176

(51) Int. Cl.
B64C 13/10 (2006.01)
B64C 13/04 (2006.01)
B64C 13/50 (2006.01)

(52) U.S. Cl.
CPC ............ B64C 13/10 (2013.01); B64C 13/042 (2018.01); B64C 13/507 (2018.01)

(58) Field of Classification Search
CPC ............................ B64C 13/10; B64C 13/507
See application file for complete search history.

(56) References Cited

U.S. PATENT DOCUMENTS 5,125,602 A * 6/1992 Vauvelle ............. B64C 13/0421
244/237
6,000,662 A * 12/1999 Todeschi ............. B64C 13/0421
244/223

(Continued)

FOREIGN PATENT DOCUMENTS

EP 2826707 A1 1/2015
GB 2127134 A 4/1984

(Continued)

OTHER PUBLICATIONS

International Preliminary Report on Patentability received for PCT Application No. PCT/GB2019/052591. Mail date: Apr. 15, 2021. 8 pages.

(Continued)

Primary Examiner — Nicholas McFall
Assistant Examiner — Marisa V Conlon
(74) Attorney, Agent, or Firm — Finch & Maloney PLLC

(57) ABSTRACT

An oscillation system includes an oscillation circuitry configured to cause at least one motor of a first set of motors to provide an oscillation of a user-input device in at least one axis of the user-input device. The oscillation may be triggered in response to an input from at least one sensor, the user-input device for operating an aircraft control system of an aircraft. The oscillation circuitry is configured to operate independently from a resistive force circuitry. The resistive force circuitry is to provide a resistive force to the user-input device, using the at least one motor of the first set of motors.

19 Claims, 2 Drawing Sheets

(56) References Cited

U.S. PATENT DOCUMENTS

| | | | | |
|---|---|---|---|---|
| 9,381,998 B2* | 7/2016 | Taylor | ................. | B64C 13/46 |
| 9,658,639 B2* | 5/2017 | Taylor | ................. | G05G 9/047 |
| 10,101,173 B2* | 10/2018 | Ludtke, II | ............ | G01C 23/005 |
| 10,967,953 B2* | 4/2021 | Zierten | ................. | B64C 13/503 |
| 2009/0187292 A1* | 7/2009 | Hreha | ................. | B64C 13/0421 |
| | | | | 701/4 |
| 2009/0266939 A1 | 10/2009 | Hanlon et al. | | |
| 2015/0344128 A1* | 12/2015 | Sandri | ................. | B64C 13/18 |
| | | | | 244/223 |

FOREIGN PATENT DOCUMENTS

| | | |
|---|---|---|
| GB | 2482407 A | 2/2012 |
| WO | 2016019091 A1 | 2/2016 |
| WO | 2020070468 A1 | 4/2020 |

OTHER PUBLICATIONS

International Search Report and Written Opinion received for PCT Application No. PCT/GB2019/052591. Mail date: Nov. 15, 2019. 10 pages.

Search Report under Section 17(5) received for GB Application No. 1816176.0 dated Mar. 29, 2019. 3 pages.

\* cited by examiner

OSCILLATION SYSTEM

BACKGROUND

There is sometimes a requirement to provide oscillation to a user-input device such as a control yoke or inceptor for an aircraft. The oscillation may be provided using an oscillation device. The oscillation of the user-input device may be triggered in response to an input from at least one sensor or warning system. The oscillation device, often known as a stick shaker, may be used as a backup or alternative to auditory or visual alerts and notify the user of the existence of the sensor input or provide a warning, potentially avoiding an accident.

Stick shakers commonly comprise an unbalanced flywheel mounted to a user-input device, the flywheel connected to a motor. The stick shaker may be used to warn a pilot of an impending stall of an aircraft. The stick shaker may induce shaking of the user-input device mimicking the frequency and amplitude of the stick shaking that can occur due to airflow separation in low-speed aircraft as they approach the stall.

DETAILED DESCRIPTION

Figure 1:
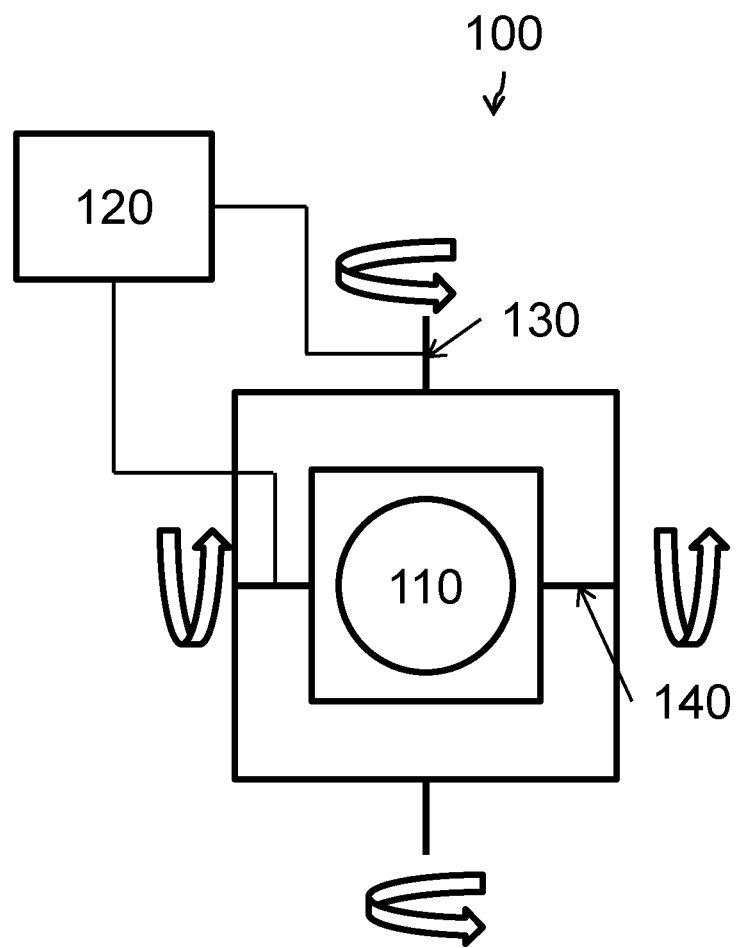
FIG. 1 illustrates a cueing apparatus for incorporation into an aircraft control system.

FIG. 1 illustrates an active cueing apparatus 100 for incorporation into an aircraft control system, the active cueing apparatus 100 comprising a user-input device 110, and a resistive force system 120. The cueing apparatus 100 is similar to the apparatus as described in US 20160004270 A1 "Inceptor Apparatus", the contents of which are hereby incorporated by reference. Active cueing apparatus 100 provides force feedback to the user-input device 110 in a predetermined relationship via the use of at least one set of motors. For simplicity the motors and other mechanisms of the cueing apparatus are not shown. The cueing apparatus 100 is able to pivot about axis 130 and axis 140, although it may also be able to pivot or rotate about other axes not shown in FIG. 1.

The feedback may be provided by a resistive force circuitry 120 in a manner similar to that disclosed in published application US 20160004270 A1. The resistive force circuitry 120 comprises at least one motor of a first set of motors. The resistive force circuitry 120 may provide a resistive force to the user-input device 110 using the at least one motor of the first set of motors. The resistive force circuitry 120 may comprise a plurality of sets of motors, and each axis may have associated with it a particular set of motors. A set of motors may be associated with one of the axis 130 and/or 140, such that the feedback is provided substantially to axis 130 and/or axis 140.

When the cueing apparatus 100 and/or resistive force circuitry 120 is operable to provide such a resistive force feedback the cueing apparatus 100 and/or resistive force circuitry 120 may be deemed to be in an active mode. If the cueing apparatus 100 and/or resistive force circuitry 120 is not operable to provide such a resistive force, the cueing apparatus 100 and/or resistive force circuitry 120 may be deemed to be in a passive mode or an inactive mode.

At least due to the possibility of system or electrical failures, or merely user preference, there may be a requirement for a cueing apparatus 100 similar to the type described in US 20160004270 A1 to comprise an oscillation system capable of oscillating the user-input device even when the cueing apparatus 100 and/or resistive force circuitry 120 is in a passive or inactive mode. A possible solution would be to include a known style of stick shaker, such as an unbalanced flywheel, into the user-input device 110 along with separate circuitry to power the motor. However the space in the user-input device 110 may be limited and adding extra motors may increase the complexity and cost of the device. Extra motors may also increase the mass of the user-input device 110 or the cueing apparatus 100 as a whole, increasing the inertia of the user-input device 110 which may negatively affect performance.

Figure 2:
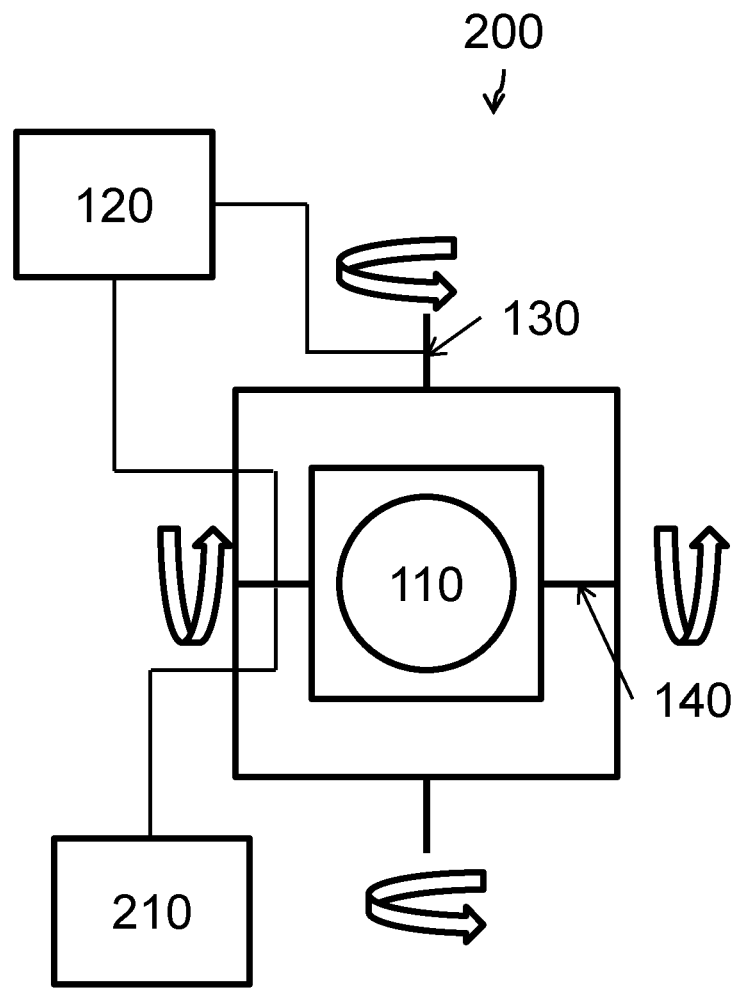
FIG. 2 illustrates a modified cueing apparatus for incorporation into an aircraft control system, the modified active cueing apparatus comprising an oscillation system.

FIG. 2 illustrates a modified cueing apparatus 200 comprising an oscillation system 210, resistive force circuitry 120 and user-input device 110. Reference numerals for similar features are shared with FIG. 1. The resistive force may be provided by the at least one motor of at least one set of motors of a resistive force circuitry 120. The resistive force circuitry 120 of the modified cueing apparatus 200 may be substantially similar to the circuitry as described in US 20160004270 A1, and may be configured to provide a resistive force in at least one of axis 130 and/or axis 140.

The oscillation system 210 allows for the user-input device 110 to be oscillated in response to an input from at least one sensor irrespective of the status of the resistive force circuitry 120, e.g. the oscillation system 210 allows for an oscillation to be applied to the user-input device 110 even when the resistive force circuitry 120 and/or the modified cueing apparatus 120 is operating in a passive mode or an inactive mode. The oscillation system 210 also allows for a stick shaker to be used in an active inceptor without the use of a offset cam or unbalanced flywheel.

The oscillation system 210 comprises oscillation circuitry configured to cause at least one motor of the first set of motors to provide an oscillation to a user-input device 110 in at least one axis of the user-input device 110. The at least one motor of the first set of motors may be shared with the resistive force circuitry 120, such that the resistive force circuitry 120 and the oscillation system 210 provide a current to the same electrical windings. The oscillation is triggered in response to an input from at least one sensor or warning system.

Due to the requirements of the oscillation circuitry, the oscillation circuitry may be significantly less complex than the resistive force circuitry 120. The oscillation circuitry may be used merely to provide an oscillation to the user-input device 110 in response to an input from at least one sensor or warning system. Therefore significantly less processing power may be required for the oscillation circuitry compared to the resistive force circuitry 120. This may allow the oscillation circuitry to be conveniently installed in a cueing apparatus without increasing the inertia of the user-input device 110. Furthermore the amplitude and frequency of the oscillation may be independent from any user input to the user-input device 110 and/or the position of the user-input device 110 relative to the aircraft. This is in contrast to the resistive force circuitry where the feedback force may be directly related to the user input to the user-input device 110 and/or the position of the user-input device 110 relative to the aircraft.

In some examples the oscillation circuitry may only be operable to provide an oscillation to the user-input device 110 when the modified cueing apparatus 200 is in a passive or inactive mode.

In some examples, the input from the at least one sensor indicates that the risk of impeding stall of the aircraft is over a threshold value. In some examples the at least one sensor may comprise a stall warning system of an aircraft. A stall warning system may use signals received from various sensors associated with the aircraft to indicate when the risk of impending stall is above a predefined threshold. In some examples the oscillation provided to the user-input device 110 may mimic an oscillation of the user-input device 110 felt if the user-input device 110 was mechanically linked to the flight control systems and the aircraft was in a stall. Hence, in some examples the magnitude of the oscillation may be directly related to the magnitude of the risk of impending stall and/or the severity of the warning.

In some examples the oscillation is at a single frequency. In some examples the oscillation is provided at multiple frequencies. In some examples the one or more frequencies are selected from a range of 0.1 Hz to 50 Hz, or preferably from 10 Hz to 25 Hz, or most preferably from 15 to 20 Hz. The at least one motor may comprise a brushless DC motor, a limited angle torque motors, direct drives or voice coil actuators however it is not limited to the aforementioned types of motors, and any suitable type of motor may be used.

In some examples the modified cueing apparatus 200 may also comprise a second resistive force circuitry to provide a resistive force to the user-input device 110 in a pre-determined relationship. The second resistive force circuitry is operable to use at least one motor of a second set of motors, and the second set of motors are separate to the first set of motors. The oscillation system 210 is configured to provide an oscillation using at least one motor of the first set of motors and/or the at least one motor of the second set of motors. The first resistive force circuitry 120 is to provide the resistive force substantially in a first axis 130 of the user-input device 110, and the second resistive force circuitry is to provide the resistive force substantially in a second axis 140 of the user-input device 110, the first axis 130 and the second axis 140 substantially orthogonal to each other. The first and second resistive force circuitry may share control units, or may have separate control units.

In some examples the oscillation is configured to be provided to at least one of a roll axis, pitch axis, and yaw axis of the user-input device 110. It is believed that a user is not able to distinguish, for example, a pitch axis stall warning being given by an oscillation in the roll axis of the user-input device 110. This may be advantageous as it at least doubles the probability of the availability of the stick shaker as the stick may be shaken by either the roll, pitch or yaw axis of the user-input device 110. This means that there is further redundancy compared to a conventional stick shaker as the oscillation may be available if at least one of the electrical windings in each axis is available, whereas in traditional stick shakers if the electrical windings or motor driving the unbalanced flywheel are not available then the conventional stick shaker would not function.

In some examples the oscillation circuitry may comprise machine readable storage media and processing means, the machine readable media containing instructions, that when executed cause the processing means to cause the at least one motor of the first set of motors to provide an oscillation of the user-input device in at least one axis of the user-input device, the oscillation triggered in response to an input from at least one sensor.

The invention claimed is:

1. An oscillation system comprising:
oscillation circuitry configured to cause a motor to provide an oscillation of a user-input device in at least one axis of the user-input device, the oscillation triggered in response to an input from at least one sensor, the user-input device for operating an aircraft control system of an aircraft; and
resistive force circuitry configured to cause the motor to provide a resistive force to the user-input device,
wherein the motor is shared with the oscillation circuitry and the resistive force circuitry, and
wherein the oscillation circuitry and the resistive force circuitry are configured to operate independently from each other such that the oscillation circuitry causes the motor to provide the oscillation of the user-input device while the resistive force circuitry is inactive and/or in a low-power state.

2. The oscillation system according to claim 1, wherein the input from the at least one sensor is indicative of a risk of a stall of the aircraft being over a threshold value.

3. The oscillation system according to claim 1, further comprising the motor, wherein the motor comprises at least one brushless DC motor, and wherein the oscillation is provided at approximately 10-25 Hz.

4. The oscillation system according to claim 1, wherein the user input device is an active inceptor.

5. The oscillation system according to claim 1, wherein the oscillation is configured to be provided to at least one of a roll axis, pitch axis, and yaw axis of the user-input device.

6. The oscillation system according to claim 1, wherein:
the resistive force provided by the resistive force circuitry to the user-input device is related to a user input provided to the user-input device by a user and/or a position of the user-input device relative to the aircraft; and
the oscillation provided by the oscillation circuitry to the user-input device is triggered in response to an input from at least one sensor sensing an impending stall condition of the aircraft.

7. A cueing apparatus for incorporation into an aircraft control system, the apparatus comprising:
the user-input device;
the oscillation system according to claim 1; and
the resistive force circuitry, wherein the resistive force circuitry is configured to provide a resistive force to the user-input device, using the motor.

8. The cueing apparatus according to claim 7, wherein the resistive force circuitry is a first resistive force circuitry, and the motor is a first motor, and the cueing apparatus further comprises:
a second resistive force circuitry to provide a resistive force to the user-input device, using a second motor, in a pre-determined relationship, the second motor being separate from the first motor;
wherein the oscillation system is configured to provide an oscillation using the first motor and/or the second motor;
wherein the first resistive force circuitry is configured to provide the resistive force substantially in a first axis of the user-input device, and the second resistive force circuitry is to provide the resistive force substantially in a second axis of the user-input device, the first axis and the second axis substantially orthogonal to each other.

9. A cueing apparatus for incorporation into an aircraft control system, the apparatus comprising:
  user-input device; and
  the oscillation system according to claim 1.

10. An aircraft comprising the cueing apparatus according to claim 9.

11. A non-transitory machine readable storage medium containing instructions that when executed by one or more processors cause a process to be carried out, the process comprising:
  causing, by oscillation circuitry, a motor of a set to provide an oscillation of a user-input device in at least one axis of the user-input device, the oscillation triggered in response to an input from at least one sensor, the user-input device for operating an aircraft control system of an aircraft;
  wherein the motor is caused to provide the oscillation independently from a resistive force circuitry, the resistive force circuitry configured to provide a resistive force to the user-input device, using the motor,
  wherein the motor is shared with the oscillation circuitry and the resistive force circuitry, and
  wherein the oscillation circuitry and the resistive force circuitry are configured to operate independently from each other such that the oscillation circuitry causes the motor to provide the oscillation of the user-input device while the resistive force circuitry is inactive and/or in a low-power state.

12. The non-transitory machine readable storage medium according to claim 11, wherein the input from the at least one sensor is indicative of a risk of a stall of the aircraft being over a threshold value.

13. The non-transitory machine readable storage medium according to claim 11, wherein the oscillation is configured to be provided to at least one of a roll axis, pitch axis, and yaw axis of the user-input device.

14. A cueing apparatus for incorporation into an aircraft control system, the apparatus comprising:
  the user-input device;
  the non-transitory machine readable storage medium according to claim 11;
  the one or more processors for executing the instructions of the non-transitory machine readable storage medium; and
  the resistive force circuitry, wherein the resistive force circuitry is configured to provide a resistive force to the user-input device, using the motor, in a pre-determined relationship.

15. The cueing apparatus according to claim 14, wherein the resistive force circuitry is a first resistive force circuitry, and the is a first motor, and the cueing apparatus further comprises:
  a second resistive force circuitry to provide a resistive force to the user-input device, using a second motor, in a pre-determined relationship, the second motor being separate from the first motor;
  wherein the process includes causing the first motor and/or the second motor to provide an oscillation; and
  wherein the first resistive force circuitry is to provide the resistive force substantially in a first axis of the user-input device, and the second resistive force circuitry is to provide the resistive force substantially in a second axis of the user-input device, the first axis and the second axis substantially orthogonal to each other.

16. A cueing apparatus for incorporation into an aircraft control system, the apparatus comprising:
  the non-transitory machine readable storage medium according to claim 11; and
  the one or more processors for executing the instructions of the non-transitory machine readable storage medium.

17. An aircraft comprising the cueing apparatus according to claim 16.

18. A cueing apparatus for an aircraft control system, the apparatus comprising:
  one or more processors; and
  a non-transitory machine readable storage medium containing instructions that when executed by the one or more processors cause a process to be carried out, the process comprising causing, by oscillation circuitry, a motor to provide an oscillation of a user-input device in at least one axis of the user-input device, the oscillation triggered in response to an input from at least one sensor, the user-input device for operating an aircraft control system of an aircraft, wherein the motor is caused to provide the oscillation independently from a resistive force circuitry, the resistive force circuitry configured to provide a resistive force to the user-input device, using the motor,
  wherein the motor is shared with the oscillation circuitry and the resistive force circuitry, and
  wherein the oscillation circuitry and the resistive force circuitry are configured to operate independently from each other such that the oscillation circuitry causes the motor to provide the oscillation of the user-input device while the resistive force circuitry is inactive and/or in a low-power state.

19. The apparatus according to claim 18, wherein:
  the input from the at least one sensor is indicative of a risk of a stall of the aircraft being over a threshold value; and
  the oscillation is configured to be provided to at least one of a roll axis, pitch axis, and yaw axis of the user-input device.

* * * * *

UNITED STATES PATENT AND TRADEMARK OFFICE
CERTIFICATE OF CORRECTION

| | |
|---|---|
| PATENT NO. | : 12,077,280 B2 |
| APPLICATION NO. | : 17/282040 |
| DATED | : September 3, 2024 |
| INVENTOR(S) | : Adam Taylor |

It is certified that error appears in the above-identified patent and that said Letters Patent is hereby corrected as shown below:

In the Claims

In Claim 11, Column 5, Line 11, delete "of a set".

Signed and Sealed this
Fifteenth Day of October, 2024

Katherine Kelly Vidal
*Director of the United States Patent and Trademark Office*